(12) United States Patent
Seligmann et al.

(10) Patent No.: US 11,686,333 B2
(45) Date of Patent: Jun. 27, 2023

(54) PLUG-IN CONNECTION SYSTEM WITH AT LEAST ONE FIRST ELEMENT AND ONE SECOND ELEMENT

(71) Applicant: Binder GmbH, Tuttlingen (DE)

(72) Inventors: Nina Seligmann, Deisslingen (DE); Jan Moll, Donaueschingen (DE)

(73) Assignee: Binder GmbH, Tuttlingen (DE)

(*) Notice: Subject to any disclaimer, the term of this patent is extended or adjusted under 35 U.S.C. 154(b) by 10 days.

(21) Appl. No.: 17/323,493

(22) Filed: May 18, 2021

(65) Prior Publication Data
US 2021/0364022 A1    Nov. 25, 2021

(30) Foreign Application Priority Data

May 19, 2020   (DE) .................. 10 2020 113 532.7

(51) Int. Cl.
*F16B 5/06*    (2006.01)

(52) U.S. Cl.
CPC .................. *F16B 5/0664* (2013.01)

(58) Field of Classification Search
CPC .... F16B 5/0664; F16B 5/0008; F16B 5/0016; F16S 1/02
USPC ......................................... 403/345
See application file for complete search history.

(56) References Cited

U.S. PATENT DOCUMENTS

| | | | |
|---|---|---|---|
| 4,936,078 A * | 6/1990 | Porter | E04B 1/6125 52/592.1 |
| 5,216,861 A | 6/1993 | Meyerson | |
| 5,404,686 A | 4/1995 | Esposito | |
| 5,502,936 A | 4/1996 | Zadok et al. | |

FOREIGN PATENT DOCUMENTS

EP    1211365    6/2002

* cited by examiner

*Primary Examiner* — Lindsay M Low
*Assistant Examiner* — Omar Morales
(74) *Attorney, Agent, or Firm* — Akerman LLP; Peter A. Chiabotti

(57) ABSTRACT

Plug-in connection system with at least one first element of a bendable first base body and one second element of a bendable second base body. The first base body can include can include an undercut into which a snap-in locking projection of the bendable first base body snaps into a securement segment of the bendable second base body. The first element and the second element can be developed as components of a climate or temperature chamber.

9 Claims, 3 Drawing Sheets

PLUG-IN CONNECTION SYSTEM WITH AT LEAST ONE FIRST ELEMENT AND ONE SECOND ELEMENT

CROSS-REFERENCE TO RELATED APPLICATIONS

This application claims priority to German Patent Application No. 10 2020 113 532.7, filed May 19, 2020, which is incorporated by reference in its entirety

BACKGROUND

The present application relates to a plug-in connection system with at least one first element and one second element.

SUMMARY

Known are plug-in connection systems with at least one first element and one second element in which, for example, two metal sheets are connected with one another using a plug-in system. However, these often have large tolerances relative to one another and, as a rule, do not form a tight connection.

The present disclosure therefore addresses the problem of providing an improved plug-in connection system with at least one first element and one second element, which enables in particular a tight, in particular a foam-tight, connection of the two elements without large expenditures.

According to the disclosure the problem is resolved through a plug-in connection system with at least one first element and one second element having the features and structures recited herein.

The plug-in connection system according to the disclosure with at least one first element and one second element, wherein the first element comprises a bendable first base body comprising a first outer face and a first inner face, and the second element comprises a bendable second base body comprising a second outer face and a second inner face, wherein the first base body comprises a first outer segment and a first connection segment comprising a first spacer segment and a first securement segment, wherein the first spacer segment is disposed between the first outer segment and the first securement segment, and the second base body comprises a second outer segment and a second connection segment comprising a second spacer segment and a second securement segment, wherein the second spacer segment is disposed between the second outer segment and the second connection segment, wherein the first spacer segment is disposed on the first outer segment with the formation of a substantially orthogonal first angle, formed on the first inner face, and the first securement segment is disposed on the first spacer segment with the formation of a substantially orthogonal second angle formed on the first outer face, wherein the second spacer segment is disposed on the second outer segment with the formation of a substantially orthogonal third angle formed on the second inner face, and the second connection segment is disposed on the second spacer segment with the formation of a substantially orthogonal fourth angle formed on the second inner face, wherein the second securement segment is developed approximately U-shaped with a first limb and a second limb, wherein the first limb is disposed substantially parallel to the second outer segment and the second limb, viewed in the plug-in direction extending parallel to the first outer segment and/or second outer segment, preferably parallel to the first and second outer segment, comprises an undercut and on the first securement comprises a snap-in locking projection which during insertion in the plug-in direction snaps into the second securement segment behind the undercut.

Such implementation of the plug-in connection between the first element and the second element has the advantage that this plug-in connection can be established through a simple movement in the plug-in direction approximately parallel to the outer face without further assembly steps being required. Through the snap-in connection a reliable connection is hereby established which, as a rule, is not readily releasable again. Such plug connection can, furthermore, enable a tight, in particular foam-tight, connection between the two elements such that, for example, a foam can be applied onto the inner face of both elements without additional measures, intended to prevent the foam from escaping before it is cured, being required.

In the connected state the first spacer segment and the second spacer segment are preferably fully in contact on one another. The tightness of the connection can thereby be further increased.

An advantageous further development provides for the first spacer segment to have a first length which, in particular, corresponds to the spacing between the first outer segment and the first securement segment, and for the second spacer segment to have a second length which corresponds, in particular, to the spacing between the second outer segment and the second securement segment, and for the first length and the second length to be matched to one another such that, in the connected state, the first outer face of the first outer segment and the second outer face of the second outer segment are located in a plane. Through such an implementation in simple manner the correct positioning of the visible surfaces, namely of the outer faces, relative to one another can be attained.

According to a preferred embodiment, for the formation of the snap-in locking projection the first securement segment comprises a first subsegment which adjoins the first spacer segment, and a second subsegment adjoining the first subsegment at an edge, wherein the second subsegment is folded at the edge onto the first subsegment, wherein the first subsegment has a third length and the second subsegment a fourth length, and wherein the fourth length is less than the third length. This implementation enables in simple manner the production of the snap-in locking projection.

For the formation of the undercut the second limb of the second securement segment comprises preferably a concave bending, for example in the form of a kink with an outer angle between 100° and 170°. This enables the simple and cost-effective production of the undercut.

According to an advantageous further development of the disclosure, the first connection segment has a width that corresponds to the width of the first outer segment, and the second connection segment has a width that corresponds to the width of the second outer segment. The connection of the two elements over the entire width is thereby enabled.

The first element and/or the second element is/are preferably implemented integrally as a single piece. This enables their simple production.

A preferred implementation provides for the first element and/or for the second element to be fabricated of a sheet metal, preferably of a steel sheet, especially preferably of a special steel sheet.

According to an advantageous further development of the disclosure, the first element and the second element are developed as press-bent elements which enables their simple production.

A plug-in connection system according to the disclosure with at least one first element and one second element is advantageously utilized in a housing of a climate or temperature chamber. The plug-in connection system according to the disclosure in simple manner enables plugging together at least one first element and one second element developed as components of the housing of the climate or temperature chamber, wherein a tight, in particular foam-tight, connection is formed such that subsequently the housing of the climate or temperature chamber can be packed with a foam, in particular a curing insulation foam, without additional measures needing to be taken to prevent the escape of the foam from the housing before it is cured.

A housing according to the disclosure of a climate or temperature chamber comprises a plug-in connection system according to the disclosure with at least one first element and one second element, wherein the first element and the second element are each developed as a component of the housing.

BRIEF DESCRIPTION OF DRAWINGS

The present application will be described in detail in conjunction with the following Figures. Therein depict:

FIGS. 1 to 3 show two different views of an embodiment example of a plug-in connection system 1 according to the application with at least one first element 10 and one second element 20.

DETAILED DESCRIPTION

Figure 1:
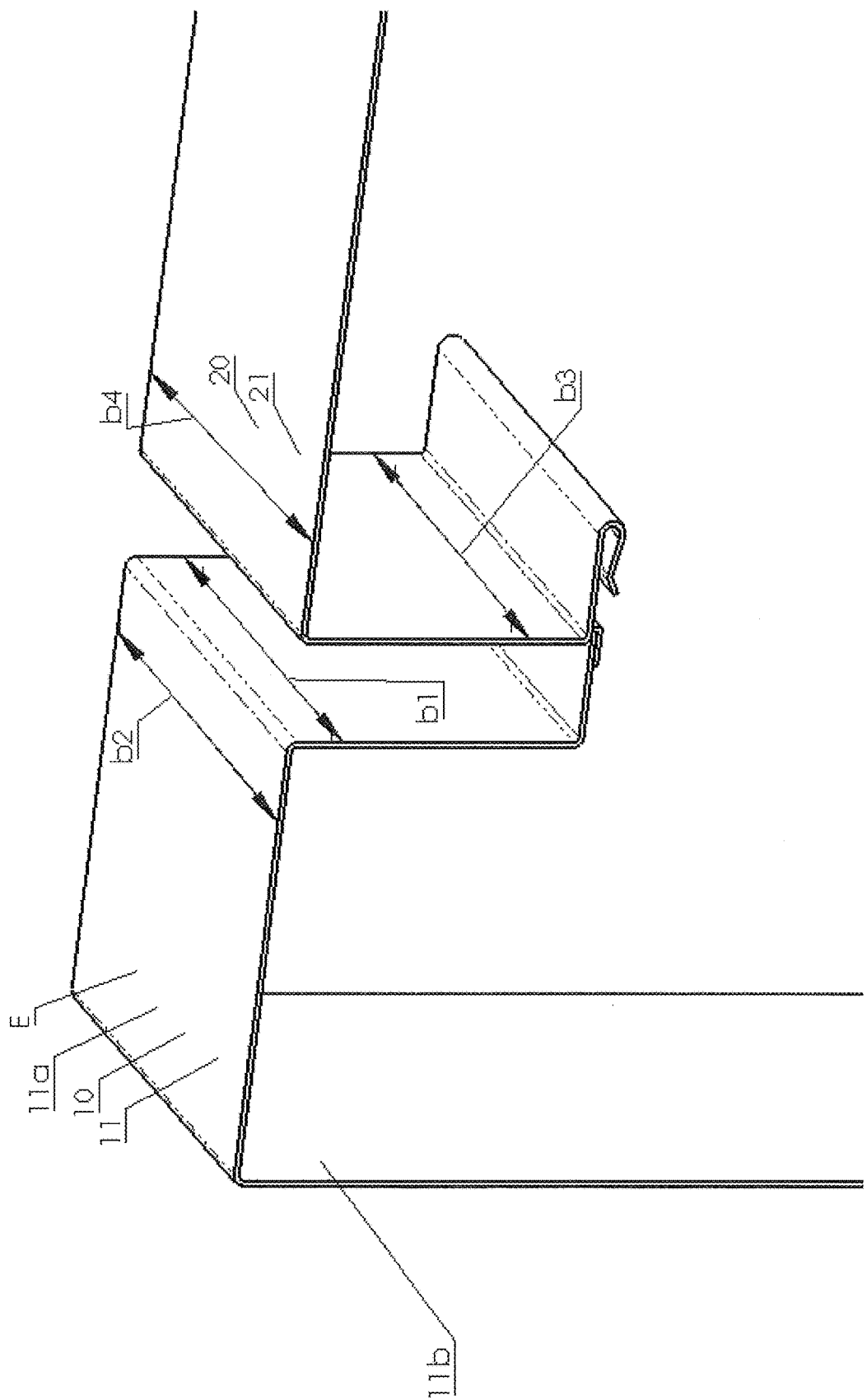
FIG. 1 a perspective view of an embodiment example of a plug-in connection system according to the application with a first element and a second element in the unconnected state, FIG. 2 a perspective view of an embodiment example of a plug-in connection system according to the application with a first element and a second element in the connected state, and FIG. 3 a side view of the plug-in connection system according to FIG. 1 with the first element and the second element in the unconnected state.

The first element 10 comprises a bendable first base body 11 with a first outer face 11a and a first inner face 11b. The first element 10 is developed in particular integrally. The first element 10 can be fabricated of a metal sheet, for example a steel sheet, preferably of a special steel sheet utilizing, for example, a press-bent process.

The first base body 11 comprises a first outer segment 12 and a first connection segment 13 which comprises a first spacer segment 14 and a first securement segment 15, wherein the first spacer segment 14 is disposed between the first outer segment 12 and the first securement segment 15.

The first spacer segment 14 is disposed on the first outer segment 12 with the formation of a first, substantially orthogonal, angle α1 formed on the first inner face 11b, while the first securement segment 15 is disposed on the first spacer segment 14 with the formation of a second, substantially orthogonal, angle α2 formed on the first outer face 11a. Therewith approximately a step-shaped implementation results through the first outer segment 12, the first segment 14 and the first securement segment 15.

The second element 20 comprises a bendable second base body 21 with a second outer face 21a and a second inner face 21b. The second element 20 is, in particular, developed integrally. The second element 20 can be fabricated of a metal sheet, for example a steel sheet, preferably a special steel sheet, using, for example, a press-bent process.

The second base body 21 comprises a second outer segment 22 and a second connection segment 23 which comprises a second spacer segment 24 and a second securement segment 25, wherein the second spacer segment 24 is disposed between the second outer segment 22 and the second securement segment 25.

The second spacer segment 24 is disposed on the second outer segment 22 with the formation of a third, substantially orthogonal, angle α3 formed on the second inner face 21b, while the second securement segment 25 is disposed on the second spacer segment 24 with the formation of fourth, substantially orthogonal, angle α4 formed on the second inner face 21b. Therewith an approximately U-shaped formation results through the second outer segment 22, the second spacer segment 24 and the second securement segment 25.

Figure 3:
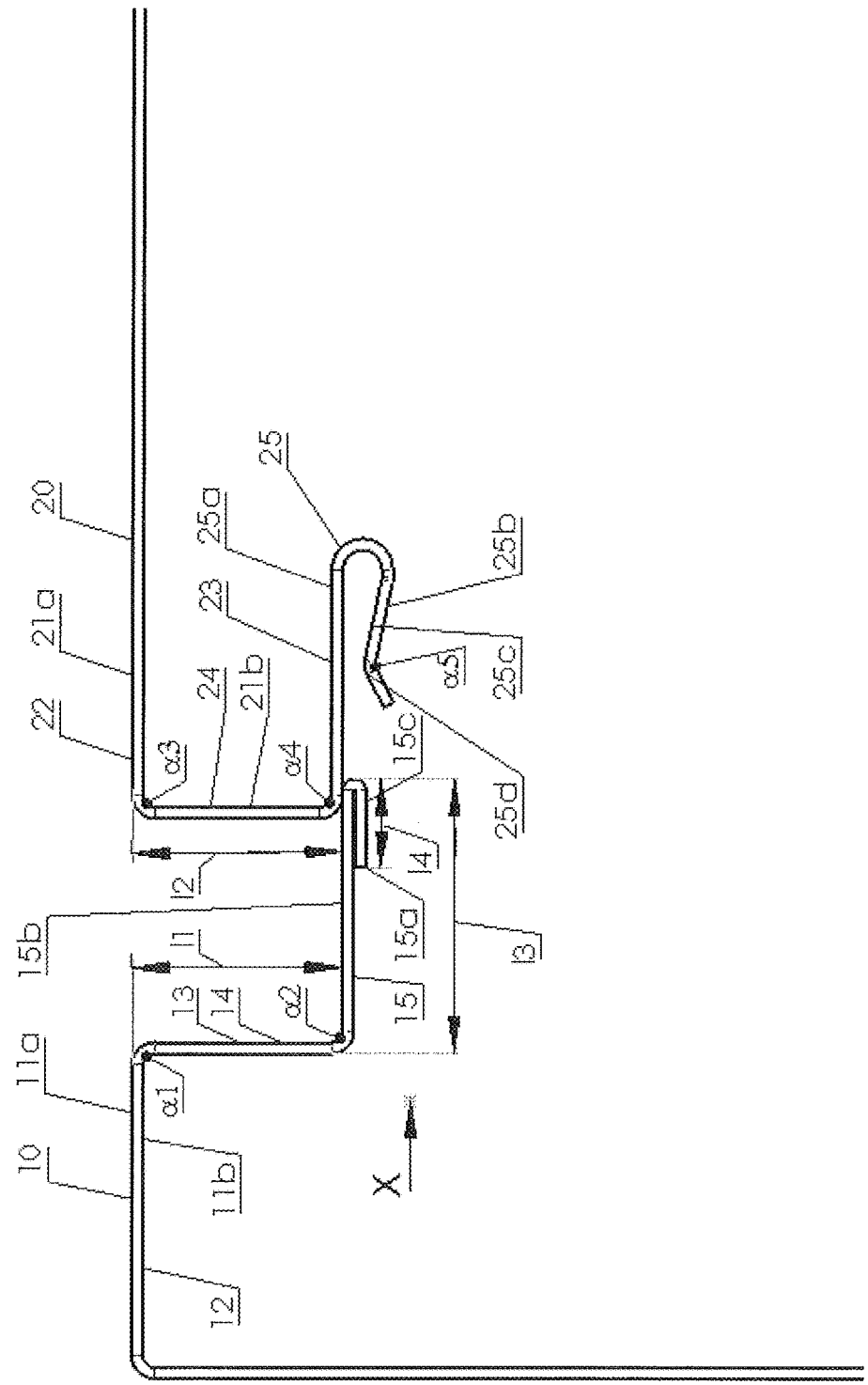

The second securement segment 25 is developed approximately U-shaped with a first limb 25a and a second limb 25b, wherein the first limb 25a is disposed substantially parallel to the second outer segment 22 and the second limb 25b, viewed in a plug-in direction X, comprises an undercut 25c. The plug-in direction X extends substantially parallel to the first outer segment 12 and/or parallel to the second outer segment 22, preferably parallel to the first outer segment 12 and parallel to the second outer segment 22. The undercut 25c can be formed through a concave bending 25d of the second limb 25b which can be formed, for example, through a kink with an outer angle α5 between 100° and 160°, for example of 135° (cf. in particular FIG. 3).

The first securement segment 15 comprises a snap-in locking projection 15a which, during the insertion in the plug-in direction X, snaps into the second securement segment 25 behind the undercut 25c. For the formation of the snap-in locking projection 15a the first securement segment 15 can comprise a first subsegment 15b adjoining the first spacer segment 14 and a second subsegment 15c adjoining the first subsegment 15b at an edge 16 [omitted in drawing], wherein the second subsegment 15c at edge 16 is folded onto the first subsegment 15b, in particular such that the first subsegment 15b and the second subsegment 15c are substantially disposed parallel to one another. The first subsegment 15b has a third length l3 and the second subsegment 15c has a fourth length l4, and wherein the fourth length l4 is less than the third length l3. At the free end of the second subsegment 15c thereby a step is formed that borders on the first subsegment 15b that forms the snap-in locking projection 15a (see in particular FIG. 3).

Figure 2:
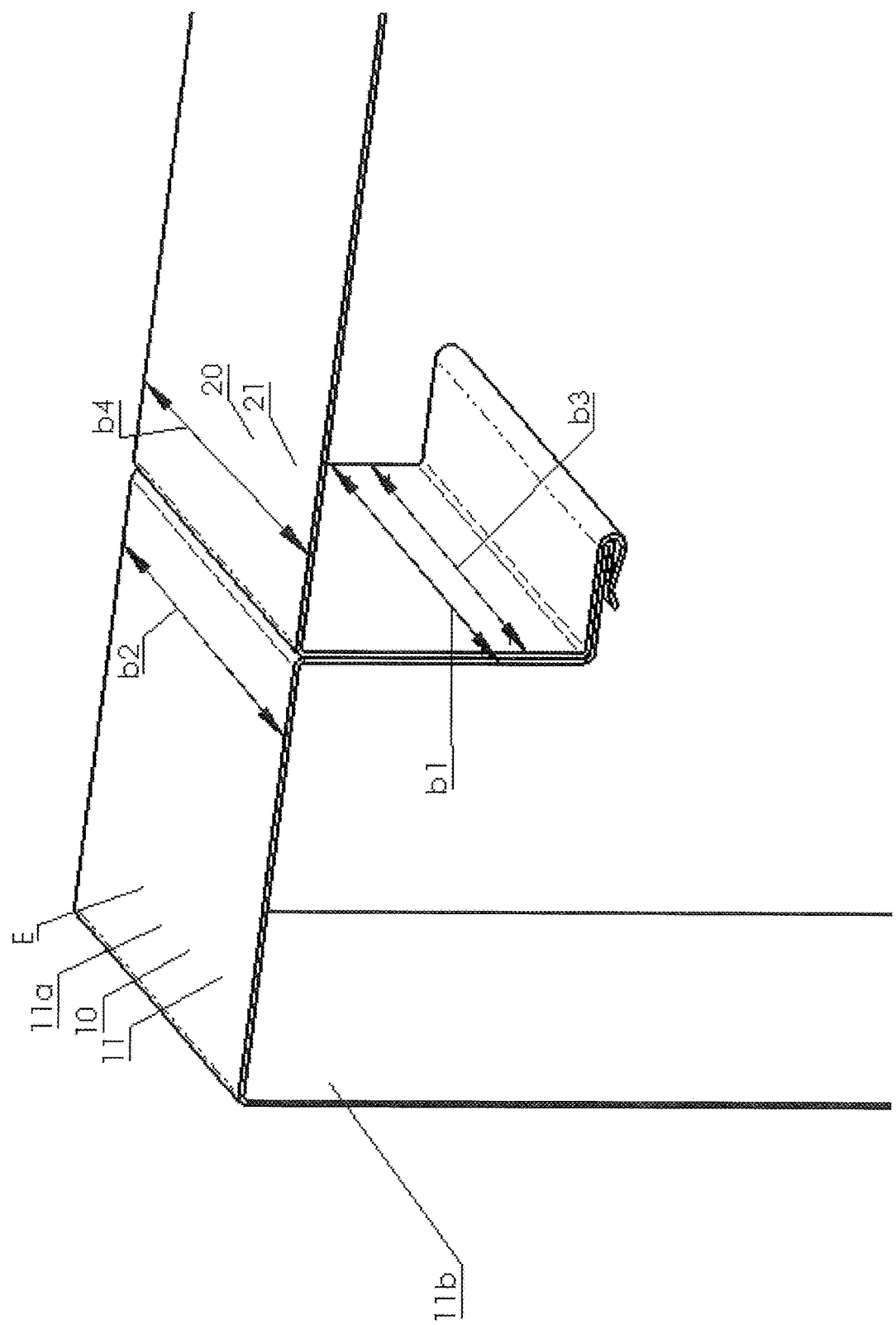

The snap-in locking projection 15a and the undercut 25c are disposed relative to one another in particular such that in the connected state the first spacer segment 14 and the second spacer segment 24 are fully in contact on one another (cf. FIG. 2).

The first spacer segment 14 has a first length l1 which corresponds in particular to the spacing between the first outer segment 12 and the first securement segment 15, and the second spacer segment 24 has a second length l2 which corresponds in particular to the spacing between the second outer segment 24 and the second securement segment 25. The first length l1 and the second length l2 can be matched to one another such that in the connected state the first outer face 11a of the first outer segment 12 and the second outer face 21a of the second outer segment 22 are located in a plane E (cf. FIG. 1).

The first connection segment 13 can have a width b1 which corresponds to the width b2 of the first outer segment 12, and the second connection segment 23 can have a width b3 which corresponds to the width b4 of the second outer segment 22. Herein, in particular, the width b2 of the first outer segment 12 and the width b4 of the second outer segment 22 can correspond to one another such that a connection over the entire width b2, b4 can be established.

The first element 10 and the second element 20 can be developed as components of a housing of a temperature or climate chamber. For the production of the temperature or climate chamber elements 10, 20 can be connected with one another through the plug-in connection in order to form the housing. A foam can subsequently be applied onto the inner side of the housing. For example, an inner boiler can also be introduced into the housing and the interspace between the housing and the inner boiler can be packed with foam.

LIST OF REFERENCE SYMBOLS

1 Plug-in connection system
10 First element
11 First base body
11a First outer face
11b First inner face
12 First outer segment
13 First connection segment
14 First spacer segment
15 First securement segment
15a Snap-in locking projection
15b First subsegment
15c Second subsegment
16 Edge [omitted in Figures]
20 Second element
21 Second base body
21a Second outer face
21b Second inner face
22 Second outer segment
23 Second connection segment
24 Second spacer segment
25 Second securement segment
25a First limb
25b Second limb
25c Undercut
25d Bending
b1 Width
b2 Width
b3 Width
b4 Width
l1 First length
l2 Second length
l3 Third length
l4 Fourth length
X Plug-in direction
E Plane
α1 First angle
α2 Second angle
α3 Third angle
α4 Fourth angle
α5 Outer angle

The invention claimed is:

1. A plug-in connection system comprising:
at least one first element and one second element,
wherein the first element comprises a bendable first base body having a first outer face and a first inner face,
wherein the second element comprises a bendable second base body having a second outer face and a second inner face,
wherein the first base body comprises a first outer segment and a first connection segment having a first spacer segment and a first securement segment,
wherein the first spacer segment is disposed between the first outer segment and the first securement segment,
wherein the second base body comprises a second outer segment and a second connection segment having a second spacer segment and a second securement segment,
wherein the second spacer segment is disposed between the second outer segment and the second connection segment,
wherein the first spacer segment is disposed on the first outer segment with the formation of a first, substantially orthogonal, angle formed on a first inner face and the first securement segment is disposed on the first spacer segment with the formation of a second, substantially orthogonal, angle formed on the first outer face,
wherein the second spacer segment is disposed on the second outer segment with the formation of a third, substantially orthogonal, angle formed on the second inner face), and the second connection segment is disposed on the second spacer segment with the formation of a fourth, substantially orthogonal, angle formed on the second inner face,
wherein the second securement segment is developed approximately U-shaped with a first limb and a second limb,
wherein the first limb is disposed substantially parallel to the second outer segment and the second limb, viewed in a plug-in direction, extending parallel to the first outer segment and/or second outer segment, comprises an undercut, and
wherein the first securement segment comprises a snap-in locking projection which, during introduction in the plug-in direction, snaps into the second securement segment behind the undercut.

2. The plug-in connection system of claim 1, wherein in the connected state the first spacer segment and the second spacer segment are fully in contact on one another.

3. The plug-in connection system of claim 1,
wherein the snap-in locking projection of the first securement segment comprises a first subsegment, adjoining the first spacer segment, and a second subsegment, adjoining the first subsegment, at an edge,
wherein the second subsegment is folded at the edge onto the first subsegment, wherein the first subsegment has a third length and the second subsegment has a fourth length, and
wherein the fourth length is less than the third length.

4. The plug-in connection system of claim 1, wherein the undercut of the second limb of the second securement segment comprises a concave bending with an outer angle between 100° and 170°.

5. The plug-in connection system of claim 1, wherein the first connection segment has a width, corresponding to a width of the first outer segment, and that the second connection segment has a width corresponding to a width of the second outer segment.

6. The plug-in connection system of claim 1, wherein the first element is developed integrally and/or the second element is or are developed integrally.

7. The plug-in connection system of claim 1, wherein the first element and/or the second element are fabricated of a metal sheet.

8. The plug-in connection system of claim 1, wherein the first element and the second element are developed as press-bent elements.

9. The plug-in connection system of claim 1, wherein the first element and the second element are each developed as components of a climate or temperature chamber.

\* \* \* \* \*